Figure 1:
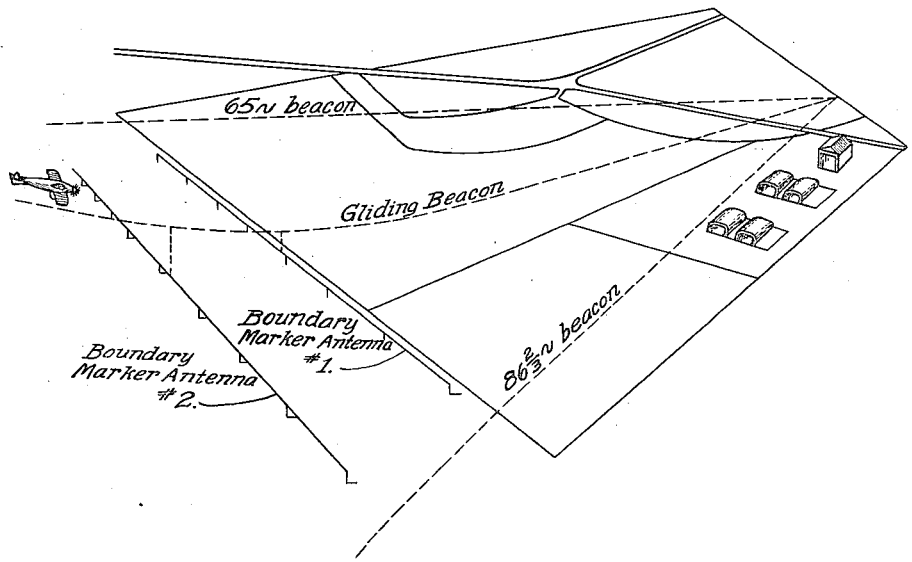

Feb. 15, 1938.                F. S. MABRY                2,108,562

RADIO SYSTEM OF FOG LANDING FOR AIRPLANES

Filed Dec. 24, 1935

WITNESSES:

INVENTOR
Forrest S. Mabry.
BY
ATTORNEY

Patented Feb. 15, 1938

2,108,562

UNITED STATES PATENT OFFICE 2,108,562

RADIO SYSTEM OF FOG LANDING FOR AIRPLANES

Forrest S. Mabry, Springfield, Mass., assignor to Westinghouse Electric & Manufacturing Company, East Pittsburgh, Pa., a corporation of Pennsylvania Application December 24, 1935, Serial No. 55,995

4 Claims. (Cl. 250—11)

My invention relates to radio transmission more particularly in its connection with its use in blind landing systems for aircraft, and has for its principal object to improve upon and simplify a blind landing system of the type described on page 18 of the Literary Digest for September 16, 1933. The blind landing arrangement disclosed in the cited publication provides for a number of radio beacons in and around a landing field so disposed as to offer to a pilot of an airplane, indications as to his position relative to the field and his line of approach so as to permit him to effect a safe landing when weather conditions are such as to blot out the landing field from his view.

A total of five beacons are provided in the system referred to. Two of these beacons each of a directional character are transmitted at an angle to each other to constitute the runway localizer, each beacon being modulated with signals of such character and in such phase relationship to each other that the signals will interlock and provide a continuous tone when received on a receiving set in a zone of equal signal intensity. The zone of equal intensity will normally coincide with the bisector of the angle of the two beacons and this zone of equal intensity is conveniently referred to as the runway localizing beacon, as it provides a guide for the pilot in approaching the landing field. Off-course positions of the plane will be indicated by a predominance of one or the other of the interlocking signals depending upon which side of the equal signal zone the airplane may happen to drift. These signals are received at relatively great distances from the field on a regular beacon receiver and a pair of head phones.

In line with the runway localizing beacon, another signal beam is transmitted, usually of lower intensity than the localizing beacon and of very much higher frequency. This beacon is so established as to extend upward and outwardly from the field at the proper landing angle for planes approaching the field. This beacon is modulated with a characteristic symbol or signal distinguishing it from the other beacons in the neighborhood and provides a guiding means for a pilot enabling him to glide down this beacon to a landing on the field. These signals are received on a special receiver the output of which is connected to a meter visible to the pilot. The pilot maneuvers the planes altitude to maintain a predetermined reading on the meter while still following the runway localizer beacon course. This procedure eventually leads the pilot to a landing.

Two boundary marker beacons are also provided, these boundary marker beacons being so established as to create walls of signal energy through which a plane approaching the landing field along the runway localizing beacon will have to pass. One of these boundary marker beacons may be established some distance from the edge of the landing field to warn the pilot of his approach to, and his distance from, the field. The second boundary marker beacon indicates that he has reached the field or is over it at such a distance from the landing point when he should throttle down his engine and pull back the control stick to be in correct position for landing when his wheels touch the ground. These two boundary marker beacons are also modulated with symbols or signals distinguishing them from each other and from other beacons.

In the system of the prior art as described in the publication cited, and which has been successfully tried out, the runway localizing beacon originated in an oscillation generator adapted to generate energy at approximately 278 kilocycles, whereas a separate oscillation generator, namely, one adjusted to generate energy at approximately 3.2 meters was employed in the production of the gliding beacon, and the boundary marker beacons were transmitted at still another frequency around 3105 kilocycles, originating at still another source of oscillations. This required that the pilot have available in his plane three different receiving apparatus, each adapted to receive and reproduce the signals being received on the various carrier frequencies representing the various beacons.

It is one object of my invention to improve upon the system disclosed above by simplifying the apparatus necessary in the production and transmission of the necessary beacons and signals.

It is another object of my invention to so simplify the apparatus necessary in the operation of a blind landing system of the type described, that the amount of apparatus necessary on an airplane to receive such indications may be considerably reduced.

Another object of my invention is to provide a system for blind landing of airplanes which shall permit of a conservation of wave channels without departing from the general operation of the system.

A further object of my invention is to provide a system for the blind landing of airplanes which shall be more economical in operation than prior systems for similar purposes.

A still further object of my invention is to provide a system of the type described which shall provide a better indication for the pilot as to his position relative to the landing field.

Figure 2:
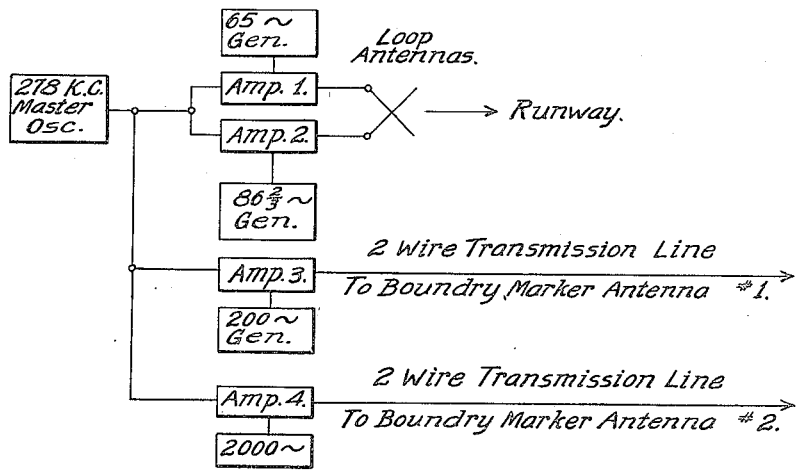

Additional objects of my invention will be pointed out in the following description of the same taken in connection with the accompanying drawing wherein:

Figure 1 is a view of a landing field indicating the relative positions and directions of the beacons utilized in the system for the blind landing of airplanes; and, Fig. 2 is a schematic outline of the manner in which I have improved upon the system known in the prior art.

Referring to Fig. 1, I have disclosed therein a gliding beacon originating at the far extremity of a landing field and extending upwardly and outwardly therefrom across the field to define the proper glide angle for the plane after it has approached in position to initiate its downward glide to a landing on the field. This gliding beam coincides with the runway localizing beacon which is powerful enough to be picked up by the pilot at great distances from the landing field, enabling him to thus follow this beacon to the vicinity of the field where he will be in position to pick up the gliding beam and guide himself to a safe landing.

The boundary marker beacons are disclosed as intersecting the gliding beam at right angles thereto and spaced apart from each other. The one furthest from the landing field will indicate to the pilot his approach toward his destination and upon passing through the second boundary marker beacon, he will know that he is to throttle down his motor and follow along the gliding beam to a safe landing.

In simplifying the apparatus of the prior art I provide a single source of frequency to constitute the carrier for both the boundary marker beacons and the runway localizing beacon which, in effect, is the result of two beacons transmitted at an angle to each other as described above.

I am enabled to do this since the pilot, if he is relying on aural reception to take advantage of the information conveyed to him by all the beacons, will not have to concentrate on all of the beacons at one time. He, first of all, will pick up the runway beacon at some great distance from the landing field and follow this beacon undisturbed by signals impressed on the other beacons, since they are of low power and occupy different signal regions which will not affect the receiver as such distance from the landing field. After approaching the landing field, the pilot will pick up the signal from the gliding beam and subsequently pass through the signal region of the first boundary marker beacon. This first boundary marker beacon is of very short duration and will indicate his distance from the landing field, and being of a different tone, may readily be distinguished from the signal impressed on the gliding beam.

The signal on the first marker beacon being of very short duration due to the motion of the plane, will quickly fade and a short time later the pilot will pick up in place thereof, the signal impressed on the second boundary marker beacon which will also be of a characteristic, which will permit the pilot to readily distinguish it from the gliding beacon indication. This second boundary marker will also be of very short duration and will consequently fade out within a very short period of time, leaving the pilot only the runway localizer and gliding beacon signals on which to concentrate.

The system may be made more convenient for the pilot of a plane by modulating the runway localizing beacon components with characteristic tones at low audio frequency, thus permitting him to resort to visual indicators for indicating his position relative to the runway localizing beacon.

In the set up disclosed in Fig. 2, I provide as my common source of oscillations an oscillation generator adjusted say to 278 kilocycles, amplifying the output therefrom through two parallel connected amplifiers in the amplifier 1 and amplifier 2, each feeding one loop of the cross loops which determine the runway localizing beacon. For visually receiving the runway beacon indications, each of the amplifiers is modulated at a low audio frequency, one being modulated at a frequency of around 65 cycles whereas the other might be modulated at a frequency of around 86⅔ cycles.

Energy from this same oscillation generator is amplified through amplifier 3 which is modulated by some characteristic tone such as by a 200 cycle generator and the output of this 200 cycle modulated amplifier is fed through a two wire transmission line to one of the boundary marker antennae. A similar amplifier, designated as amplifier 4, also couples to the same oscillation generator and is modulated by a still different tone, namely, one around 2000 cycles and this modulated energy is fed through a two-wire transmission line to the other boundary marker antenna. Thus the same source of oscillations supplies the carrier for the runway localizing beacon as well as each of the boundary marker beacons, the modulations on each of these beacons being relied upon to distinguish them from each other.

The system as thus modified will reduce and simplify the amount of apparatus formerly considered necessary, since it permits the elimination of the separate source of oscillation for the boundary marker beacons and further results in a centralization of the apparatus thus resulting in a more economical installation, and apparatus thus centralized is more readily serviced and installed.

Further, the system as simplified avoids the necessity of occupying an additional wave channel which is an important advantage due to the scarcity of available channels for such purposes. In addition to the above and through the elimination of one channel, the apparatus necessary on a plane may be reduced to the extent of discarding a complete receiving outfit, since the pilot may receive on one of his receivers that which required an additional receiver when operating in accordance with prior practice.

In the system thus far described one might expect some interference between the carrier of the boundary marker beacons and the carrier of the runway localizing beacon, in that they would cancel out at certain points, rendering it difficult for the pilot to receive any signals at those points.

I further improve the system to avoid this possibility, by transmitting the boundary carrier beacons at side band frequencies only. Thus by eliminating the carrier from the boundary marker beacons, possible interference between these beacons and the runway localizing beacon is avoided.

If only one side band is transmitted, the pilot will receive the tone modulation impressed upon the boundary marker beacons as he passes through them, giving him the information he desired.

Should both side bands be transmitted, the frequency which the pilot will receive on passing through a boundary marker beacon will begin with the modulated frequency of the beacon and periodically shift to double the frequency as the pilot approaches along the runway beacon in wave length steps of the carrier. This phenomena may be utilized to advantage, particularly where the boundary marker beacons are sharp, or well defined, to give the pilot some indication as to his position while travelling from one boundary marker beacon to the other and beyond. Circuits for producing single or double side band transmission are well known in the art and are therefore not disclosed. Any of these old and well known systems may be utilized in the manner and for the purpose described by me above.

While I have described my invention in great detail, I do not desire to be limited in my protection to such details except as may be restricted by the prior art and the appended claims.

I claim as my invention:

1. The method of transmitting signals to a common receiver from a plurality of locations utilizing a common source of carrier frequency without producing phase distortion, at any place within range of the transmission, which comprises transmitting energy from one of said locations as modulated carrier energy and the energy from others of said locations as modulated suppressed carrier energy.

2. The method of transmitting signals to a common receiver from a plurality of locations utilizing a common source of carrier frequency without producing phase distortion, at any place within range of the transmission, which comprises transmitting energy from one of said locations as modulated carrier energy and the energy from another of said locations as single side band energy.

3. In a system for the blind landing of airplanes, the combination of a runway localizing beacon, a beacon for marking a boundary, both of said beacons originating from a common carrier frequency source, means for modulating each of said beacons with identifying symbols, and means for suppressing the carrier frequency from said boundary marking beacon.

4. The method of transmitting signals to a common receiver from a plurality of locations utilizing carrier wave sources of the same frequency, without producing phase distortion at any place within range of the transmission, which comprises transmitting energy from at least one of said locations as modulated carrier energy and the energy from another of said locations as modulated suppressed carrier energy.

FORREST S. MABRY.